US012615419B2

(12) United States Patent
Chen et al.

(10) Patent No.: US 12,615,419 B2
(45) Date of Patent: Apr. 28, 2026

(54) DIGITAL CONTENT COMPETITION REVIEW METHOD

(71) Applicant: GAMANIA DIGITAL ENTERTAINMENT CO., LTD., Taipei City (TW)

(72) Inventors: Kuan-Yu Chen, Taipei City (TW); You-Lin Yao, Taipei City (TW); Yu-Yin Lee, Taipei City (TW); Chuin-Yien Lim, Taipei City (TW); Hsin-Yu Chaing, Taipei City (TW)

(73) Assignee: GAMANIA DIGITAL ENTERTAINMENT CO., LTD., Taipei City (TW)

( * ) Notice: Subject to any disclaimer, the term of this patent is extended or adjusted under 35 U.S.C. 154(b) by 0 days.

(21) Appl. No.: 18/769,751

(22) Filed: Jul. 11, 2024

(65) Prior Publication Data

US 2025/0343973 A1 Nov. 6, 2025

(30) Foreign Application Priority Data

May 2, 2024 (TW) ................................. 113116364

(51) Int. Cl.
*H04N 21/475* (2011.01)
*H04L 67/1396* (2022.01)

(52) U.S. Cl.
CPC ..... *H04N 21/4756* (2013.01); *H04L 67/1396* (2022.05)

(58) Field of Classification Search
CPC ........................ H04N 21/4756; H04L 67/1396
See application file for complete search history.

(56) References Cited

U.S. PATENT DOCUMENTS

2025/0378275 A1 * 12/2025 Mehta ..................... G06F 40/55

FOREIGN PATENT DOCUMENTS

WO WO-2025150185 A1 * 7/2025 ............... H04N 7/18

* cited by examiner

*Primary Examiner* — Joshua D Taylor
(74) *Attorney, Agent, or Firm* — MUNCY, GEISSLER, OLDS & LOWE, P.C.

(57) ABSTRACT

A digital content competition review method includes the competition review application captures user behavior tags based on user accounts, and by using a category tag of a plurality of digital contents corresponding to the user behavior tag as a screening condition, screens out those digital contents from the database sends it to a group pairing unit; conducts a plurality of group pairings for those digital contents, and transmits those group pairings to the competition review application; and displays the group pairing through a PK page on a display screen of the terminal device for the user to execute a voting behavior; based on the voting behavior, computes a team popularity of a competing team that the voted digital content belongs to, and computes a popularity contribution of the user to the team popularity of the competing team, and sends them back to a score result page.

10 Claims, 7 Drawing Sheets

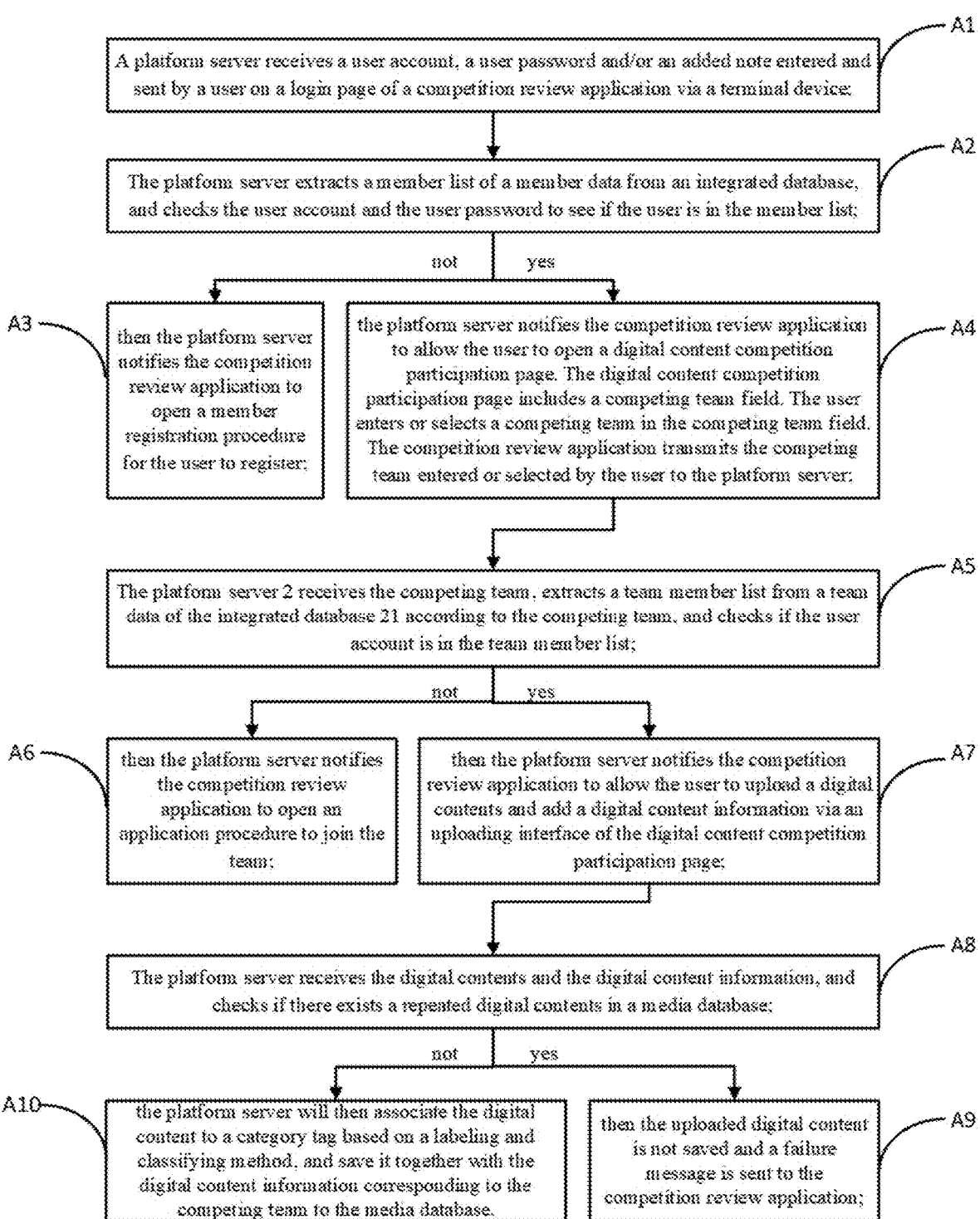

A1 — A platform server receives a user account, a user password and/or an added note entered and sent by a user on a login page of a competition review application via a terminal device;

A2 — The platform server extracts a member list of a member data from an integrated database, and checks the user account and the user password to see if the user is in the member list;

not     yes

A3 — then the platform server notifies the competition review application to open a member registration procedure for the user to register;

A4 — the platform server notifies the competition review application to allow the user to open a digital content competition participation page. The digital content competition participation page includes a competing team field. The user enters or selects a competing team in the competing team field. The competition review application transmits the competing team entered or selected by the user to the platform server;

A5 — The platform server 2 receives the competing team, extracts a team member list from a team data of the integrated database 21 according to the competing team, and checks if the user account is in the team member list;

not     yes

A6 — then the platform server notifies the competition review application to open an application procedure to join the team;

A7 — then the platform server notifies the competition review application to allow the user to upload a digital contents and add a digital content information via an uploading interface of the digital content competition participation page;

A8 — The platform server receives the digital contents and the digital content information, and checks if there exists a repeated digital contents in a media database;

not     yes

A10 — the platform server will then associate the digital content to a category tag based on a labeling and classifying method, and save it together with the digital content information corresponding to the competing team to the media database.

A9 — then the uploaded digital content is not saved and a failure message is sent to the competition review application;

Fig. 6

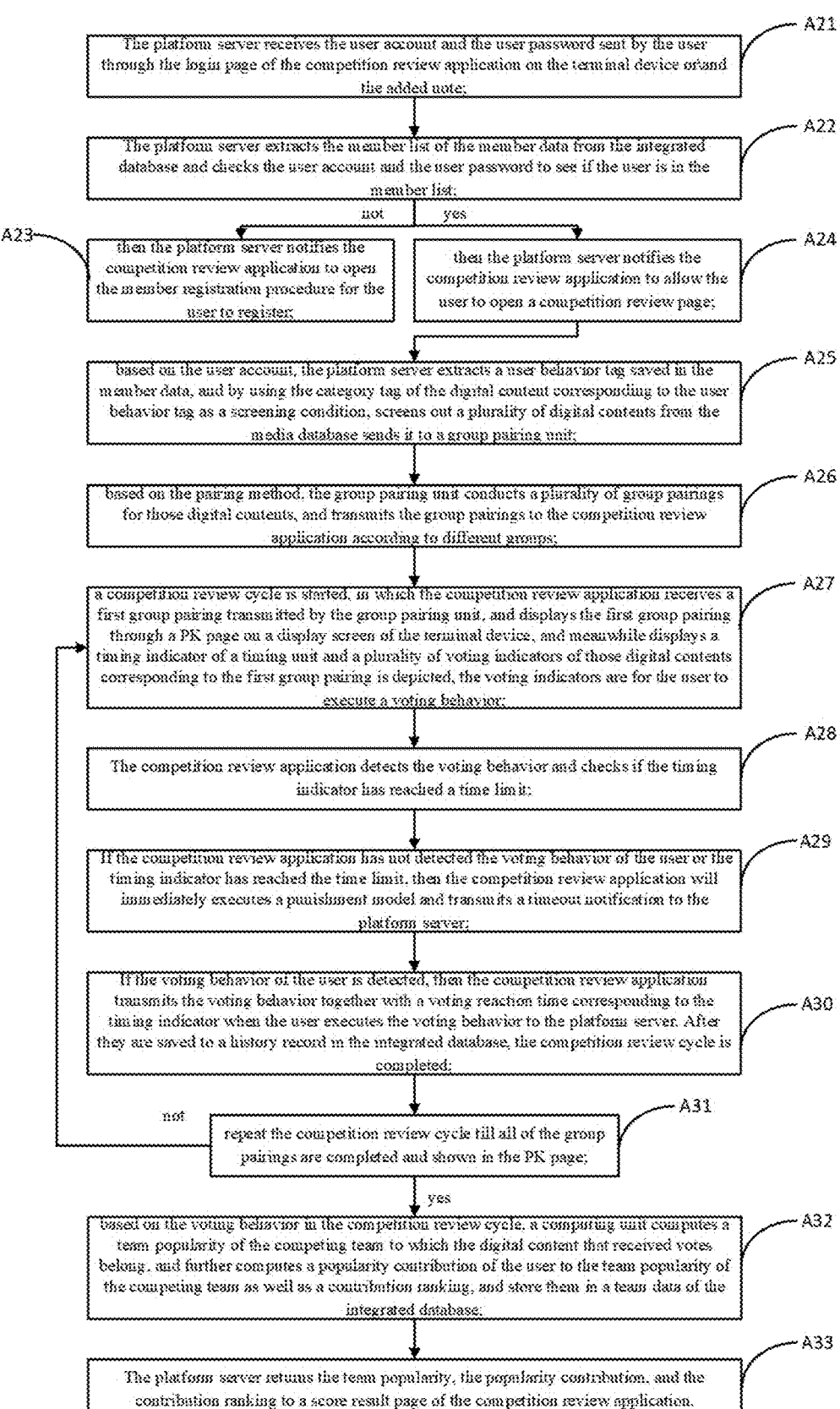

The platform server receives the user account and the user password sent by the user through the login page of the competition review application on the terminal device or/and the added note; — A21

The platform server extracts the member list of the member data from the integrated database and checks the user account and the user password to see if the user is in the member list; — A22 not          yes

A23 — then the platform server notifies the competition review application to open the member registration procedure for the user to register;

A24 — then the platform server notifies the competition review application to allow the user to open a competition review page;

based on the user account, the platform server extracts a user behavior tag saved in the member data, and by using the category tag of the digital content corresponding to the user behavior tag as a screening condition, screens out a plurality of digital contents from the media database sends it to a group pairing unit; — A25 based on the pairing method, the group pairing unit conducts a plurality of group pairings for those digital contents, and transmits the group pairings to the competition review application according to different groups; — A26 a competition review cycle is started, in which the competition review application receives a first group pairing transmitted by the group pairing unit, and displays the first group pairing through a PK page on a display screen of the terminal device, and meanwhile displays a timing indicator of a timing unit and a plurality of voting indicators of those digital contents corresponding to the first group pairing is depicted, the voting indicators are for the user to execute a voting behavior; — A27

The competition review application detects the voting behavior and checks if the timing indicator has reached a time limit; — A28

If the competition review application has not detected the voting behavior of the user or the timing indicator has reached the time limit, then the competition review application will immediately executes a punishment model and transmits a timeout notification to the platform server; — A29

If the voting behavior of the user is detected, then the competition review application transmits the voting behavior together with a voting reaction time corresponding to the timing indicator when the user executes the voting behavior to the platform server. After they are saved to a history record in the integrated database, the competition review cycle is completed; — A30 not repeat the competition review cycle till all of the group pairings are completed and shown in the PK page; — A31 yes based on the voting behavior in the competition review cycle, a computing unit computes a team popularity of the competing team to which the digital content that received votes belong, and further computes a popularity contribution of the user to the team popularity of the competing team as well as a contribution ranking, and store them in a team data of the integrated database; — A32

The platform server returns the team popularity, the popularity contribution, and the contribution ranking to a score result page of the competition review application. — A33

Fig. 7

DIGITAL CONTENT COMPETITION REVIEW METHOD

CROSS-REFERENCE TO RELATED APPLICATIONS

This non-provisional application claims priority under 35 U.S.C. § 119 on Patent Application No. TW113116364 filed in Taiwan, Republic of China May 2, 2024, the entire contents of which are hereby incorporated by reference in its entirety.

FIELD OF THE INVENTION

The present invention relates to a method to collect popularity scores of digital contents, and more particularly to a method to let users act as reviewers through a digital content competition mechanism.

BACKGROUND OF INVENTION

In the prior art, popularity of digital contents are basically assessed through intuitive numerical statistics based on likes, tracks, visits, and comments. Another method is using human subjective assessment, i.e., the popularity of digital contents are judged subjectively by human reviewers. The drawback of this method is high labor cost and time consumption.

Moreover, due to the rapid and complicated dissemination of information at present, many users neglect operations of likes, tracks, and comments after viewing the digital contents. As a result, using likes, tracks, and comments to assess the popularity of digital contents may not be objective.

In view of this, the present invention adopts team competition, in which team members upload objects to help the team accumulate popularity scores, and based on the accumulated popularity scores, the teams receive awards through competition and ranking. To maximize the fun of the competition, competition review models are added for digital content PK. With participation of multiple teams, objects are paired for competition between different teams, and the users can play the role of reviewers. The whole process will have more fun, and popularity scores can be collected within a short period of time.

SUMMARY OF THE INVENTION

The present invention solves the problem that, in the prior art, the users may become tired of the feedback mechanism for the popularity of digital contents, and can quickly guide the users to select their favorite digital contents. The present invention designs the assessment of digital content popularity into a form of competition to let the users become reviewers and to show the contribution of users. Through this design, the users can be encouraged to complete the digital content competition.

In the present invention of a digital content competition review method, a platform server receives a user account and a user password sent by a user through a login page of a competition review application on a terminal device; based on the user account, the platform server extracts a user behavior tag saved in an integrated database, and by using a category tag of a digital content corresponding to the user behavior tag as a screening condition, screens out a plurality score of the digital content from a media database sends it to a group pairing unit; based on a pairing method, the group pairing unit conducts a plurality of group pairings for the digital content, and transmits the group pairings to the competition review application according to different groups; a competition review cycle is started, in which the competition review application receives a first group pairing transmitted by the group pairing unit, and displays the first group pairing through a PK (battle) page on a display screen of the terminal device, and meanwhile displays a timing indicator and a plurality of voting indicators of the digital content corresponding to the first group pairing, the voting indicators are for the user to execute a voting behavior; if the competition review application detects a voting behavior of the user, it will transmit the voting behavior to a computing unit and save it to a history record of the integrated database; based on the voting behavior in the competition review cycle, the computing unit computes a team popularity of a competing team that the voted digital content belongs to, and further computes a popularity contribution of the user to the team popularity of the competing team as well as a contribution ranking, and sends them back to a score result page of the competition review application to complete the competition review cycle; the competition review cycle is repeated till all of the group pairings are displayed on the PK (battle) page.

After each competition review cycle is completed, the user can see the voting record of the digital content, the team behind the digital content, the increased scores of popularity of the team contributed by this voting, the current ranking of the team, as well as such information as how many people believe the team will win the championship.

If the user fails to click the voting indicator before expiry of the time limit, the competition review application will execute a punishment model, and the record selected during this cycle will be hidden, and won't be unlocked until the user completes another cycle.

During the competition review cycle, information of uploaders and information of teams are hidden for the purpose of fair play.

BRIEF DESCRIPTION OF THE DRAWINGS

FIG. 6 The flow chart of the digital content competition review method for the user to upload digital contents.

FIG. 7 The flow chart of the digital content competition review method for the user to participate in the digital content competition review.

DETAILED DESCRIPTION OF THE INVENTION

In this specification, "content" is a concept that represents information or individual information elements implemented in text, images, videos, audio files, or a combination thereof, and can be displayed.

In this specification, the terms "unit", "device", "terminal", "server" or "system" refer to a combination of hardware and software executed by corresponding hardware. For example, the hardware may be a data processing device, such as a mobile device or a personal computer with a built-in central processing unit or other processor. In addition, software executed by hardware may refer to executed programs, objects, executable files, threads, programs, etc. herein.

Persons of ordinary skill in the art should have general knowledge of computer structure and computer organization, and can understand that the present invention is not limited to the form of these computers and the architecture of network connections. The platform server of the present invention can be composed of multiple computers, as long as it provides corresponding functions. The computer includes a processor, a module memory connected to the processor, and a servo network. road interface. The processor can be used to execute operating systems and applications stored in the memory, including database management systems (DBMS), web servers and/or web application servers, used to implement multiple steps mentioned in the embodiments of the present invention. The present invention as a whole can be implemented through a website platform, an application program (APP) or other means.

Figure 1:
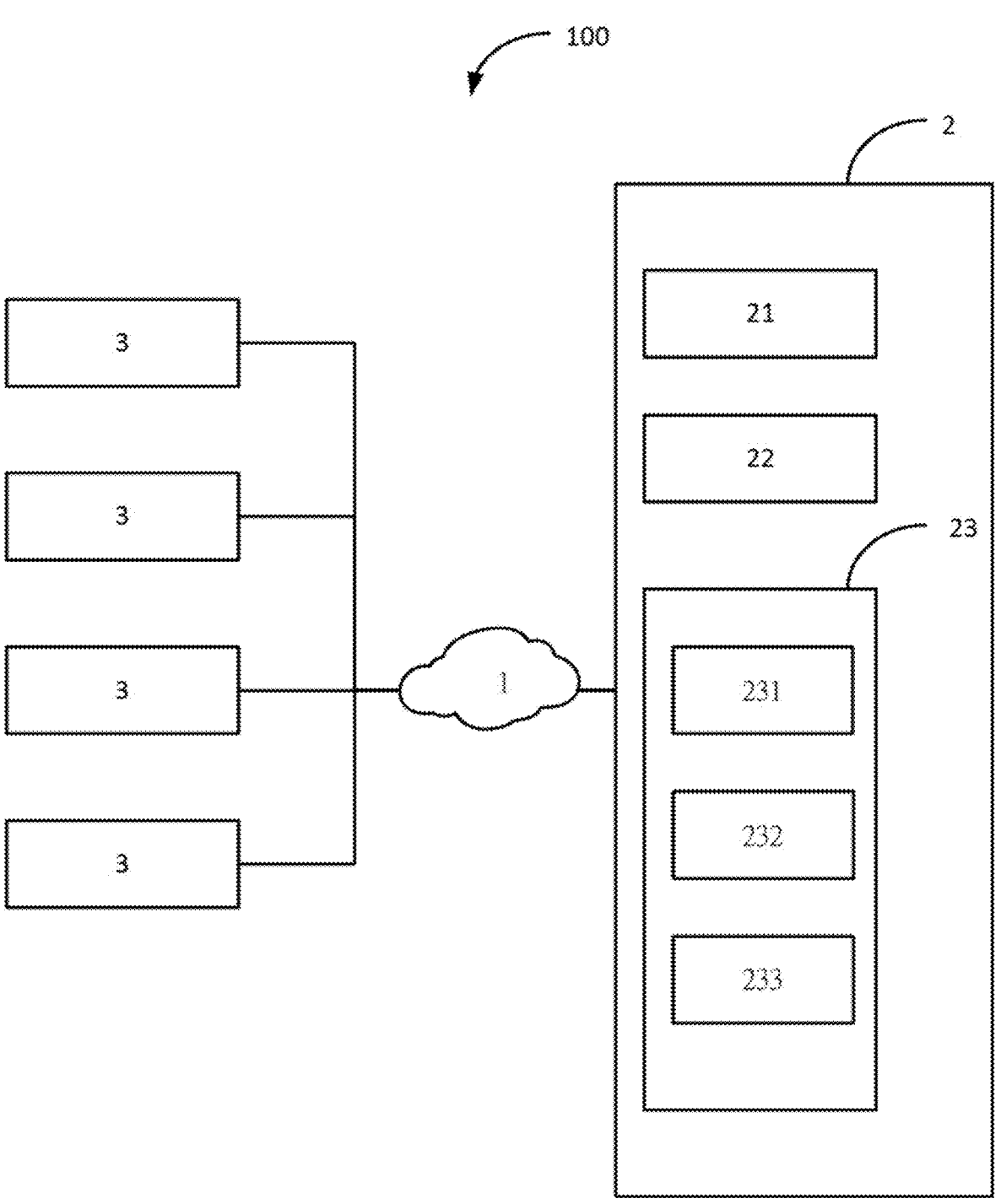
FIG. 1 The block diagram of system for the digital content competition review method.

A system adopting the digital content competition review method is disclosed in FIG. 1. The system 100 includes: a plurality of terminal devices 3, the terminal devices 3 being installed with a competition review application, a platform server 2, the terminal devices 3 being connected to the platform server 2 via an Internet 1, the platform server 2 including an integrated database 21, the integrated database 21 containing a member data, a team data, and a history record, a media database 22 containing a plurality of digital content information of a plurality of digital contents 4, a processor 23, the processor 23 including a group pairing unit 231, a timing unit 232, and a computing unit 233.

The group pairing unit 231 uses a category tag corresponding to a user behavior tag of a user as the screening condition to screen out the close digital contents 4 for group pairing. The number of paired groups and the number of digital contents in each paired group can be set by the administrator.

In one embodiment, the user behavior tag of the user is equal to the category tag of the digital contents 4.

Preferred number of paired groups is 3~10, and preferred number of digital contents in each group is 2. If there are less than 2 digital contents, 1 digital content is displayed.

If there are multiple digital contents 4, and the group pairings cannot be completed within the set number of paired groups, each of the groups can also be paired using multiple digital contents, so that all of the digital contents 4 can participate in the competition.

The timing unit 232 conducts timing based on a time limit. Either counting up or down, the timing starts from the beginning of a competition review cycle, and is terminated upon occurrence of a voting behavior of the user or upon expiry of the time limit.

The computing unit 233 computes a team popularity. Based on a plurality of voting behaviors of a plurality of users for the digital contents 4, it computes the votes of each corresponding a competing team, and further computes the team popularity of each the competing team.

The computing unit 233 also computes a popularity contribution by the user to the team popularity of the competing team, and computes a contribution ranking based on the popularity contributions by the users. For example, if Team A wins 100 votes in this competition and User A gives Team A 10 votes during this competition, then the popularity contribution by User A to Team A is 10%. It is to be understood that the above example is not intending to limit the present invention.

The computing unit 233 also computes a user behavior statistics. Based on an added note, the voting behavior, and a voting reaction time of the user, the favorite digital contents 4 of the user are statistically analyzed, and the user with a relevant user behavior tag is saved to the member data of the integrated database 21. For example, if, a) the added note of the user shows the user likes playing basketball, b) the past voting behaviors of the user is inclined to basketball, c) the voting reaction time of the user for basketball is quicker than other categories, then basketball is marked as the user behavior tag of the user.

In one embodiment, the user behavior statistical analysis also includes event tracking of the interaction data of the user on other related collaborating platforms via the APP, including clicked contents, participated competitions, and joined teams. For example, if the statistic record of the interaction data of the user shows {'basketball': {'ent': 100, 'pref': 0.8}}, it indicates the user has interacted with a total of 100 contents in the category of basketball, which account for 80% of the user's favorite contents.

The member data includes member list, member account, member password, member information, and user behavior tag.

The team data includes team list, team member list, team account, team password, team description, joining qualification, explanation of the creation, and team popularity.

The history record includes the user's digital content uploading record and the user's voting behavior record.

The digital contents 4 includes images, photos, videos, texts, audios, and contents imported from an external platform.

The category tags include but are not limited to first-layer images, photos, videos, texts, audios, and contents imported from an external platform.

The category tags also include but are not limited to second-layer NFTs, games, songs, illustrations, maps, drawings, sports, matches, astronomy, and nature.

The user behavior tag includes both but is not limited to first-layer images, photos, videos, texts, audios, contents imported from an external platform, and second-layer NFTs, games, songs, illustrations, maps, drawings, sports, matches, astronomy, and nature.

Figure 2:
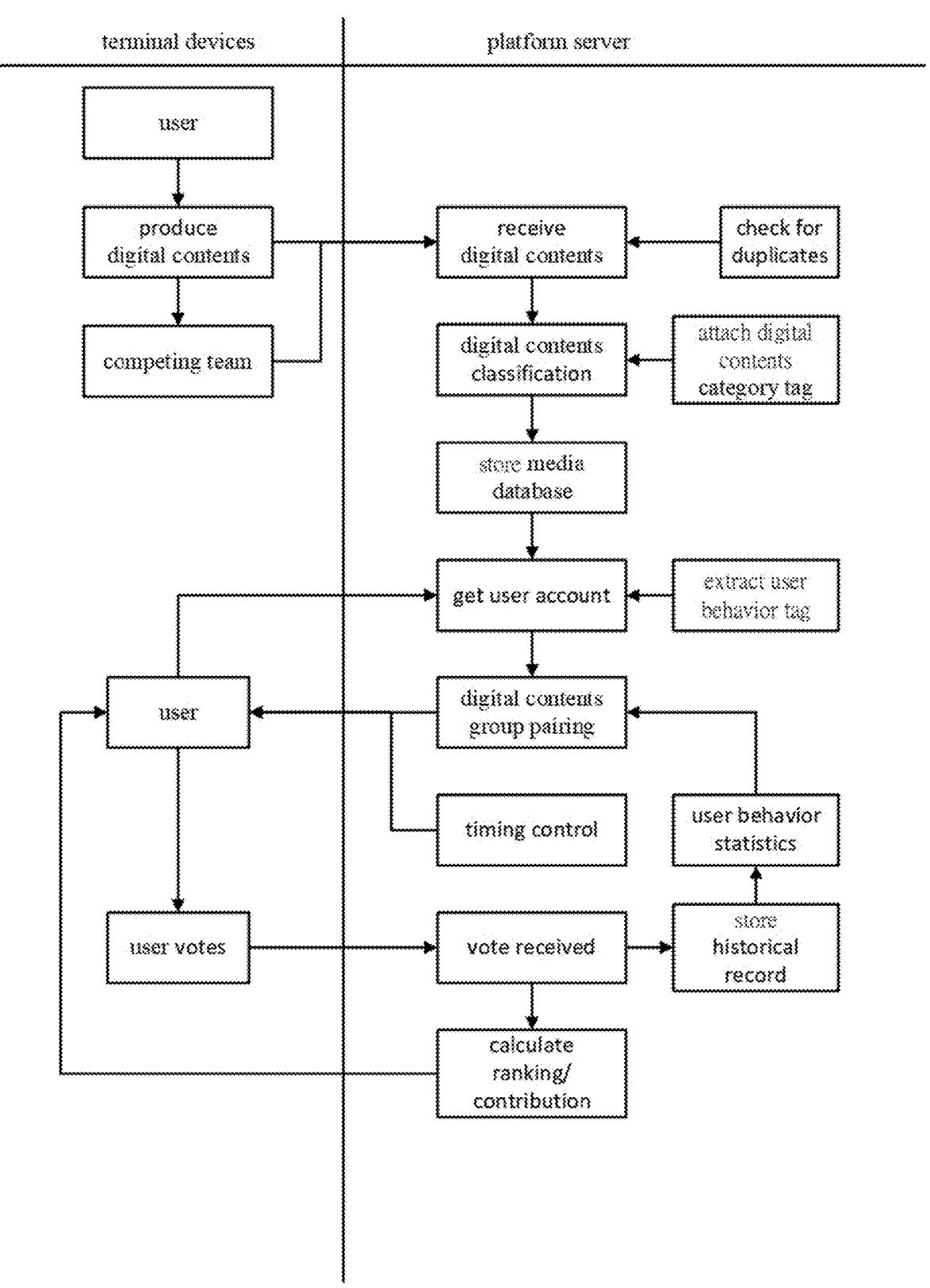
FIG. 2 The block diagram of the digital content competition review method.

A digital content competition review method is depicted in FIG. 2. The digital contents 4 uploading and classifying method includes: a user produces a digital contents 4, the user uses a terminal device 3 to open a competition review application and accesses a platform server 2 via an Internet 1, the user enters a user account, a user password and/or an added note on a login page of the competition review application to be transmitted to the platform server 2; the platform server 2 extracts a member list of a member data from an integrated database 21, and checks the user account and the user password to verify if the user has a member qualification; if yes, then allows the user to proceed to the operation of the competition review application; the user clicks to enter a digital content competition participation page of the competition review application, and on the digital content competition participation page, selects or inputs a competing team; the platform server 2 checks a team member list in a team data of the integrated database 21 to verify if the user is a member of the competing team, if yes, then allows the user to upload the digital contents 4 and add a digital content information to the platform server 2 via an uploading interface; the platform server 2 receives the digital contents 4 and the digital content information, classifies the digital contents 4 based on a labeling and classifying method, and saves the digital contents 4 with relevant a category tag to a media database 22 according to the corresponding competing team.

In the above process, the platform server 2 checks the user account and the user password in the member data to verify if the user has the member qualification, if not, then opens a user registration page to let the user register under the guide of the user registration page, and after completion of the registration, allows the user to proceed to the operation of the competition review application.

The platform server 2 checks the team member list in the team data to verify if the user is a member of the competing team, if not, then opens a team membership application page to allow the user to select or input the competing team that the user wants to join, and after the user has joined the competing team, allows the user to proceed to the operation of the competition review application.

The platform server 2 checks the digital contents 4 uploaded by the user to the media database 22, if there is already an identical digital contents 4 saved in the media database 22, the media database 22 will no longer save the digital contents 4.

Furthermore, the platform server 2 checks the digital contents 4 based on a limiting tag, if the digital contents 4 meets the limiting tag, then it will not allow the digital contents 4 to be uploaded. The limiting tag includes but is not limited to the following conditions: the digital contents 4 is copyrighted, the resolution is insufficient, the file is too big or too small, and the digital contents 4 involves public nudity or is contrary to public order or good morals.

The digital contents 4 uploading and classifying method according to the present invention also includes: the competing team uses the terminal device 3 to open the competition review application and access the platform server 2 via the Internet 1, the competing team enters a team account and a team password on a team login page of the competition review application; the platform server 2 checks a team list, the team account and the team password in the team data, to verify if the competing team is in the team list, if yes, then allows the competing team to batch upload a plurality of digital contents 4.

The terminal device 3 includes computer, tablet, mobile phone, smart watch, or any electronic device such as a PC or a mobile terminal that can upload or view files.

The digital content information includes digital content description, type, and tag.

The added note includes the user's name, gender, interest, and occupation.

The labeling and classifying method includes using natural language to analyze the description of the digital content based on the type of the digital contents 4, and relying on AI (artificial intelligence) to judge the digital contents 4, and associating the digital contents 4 to the category tag through the above method.

In one embodiment, the labeling and classifying method also includes multi-layer labeling, wherein the first-layer labeling includes but is not limited to: photos and stories, pure texts, audios, and contents imported from external platforms.

In one embodiment, the labeling and classifying method further also includes second-layer labeling, said second-layer labeling includes but is not limited to: NFTs, games, songs, illustrations, maps, drawings, sports, matches, astronomy, and nature.

Embodiment 1

A digital content competition review method is depicted in FIG. 2. The digital content competition review method includes: a user uses a terminal device 3 to open a competition review application and accesses a platform server 2 via an Internet 1, the user enters a user account, a user password and/or an added note on a login page of the competition review application, which are then transmitted to the platform server 2; the platform server 2 extracts a member list of a member data from an integrated database 21, checks the user account and the user password to verify if the user has a member qualification, if yes, then allows the user to proceed to the operation of the competition review application; the user clicks to enter a competition review page of the competition review application; based on the user account, the platform server 2 extracts a user behavior tag from the member data, and uses a category tag of a digital contents 4 corresponding to the user behavior tag as the screening condition to screen out a plurality of digital contents 4 from a media database 22, which are then transmitted to a group pairing unit 231; based on a pairing method, the group pairing unit 231 conducts a plurality of group pairings for the digital contents 4; a competition review cycle is started, wherein the platform server 2 transmits the digital contents 4 of a first group pairing to a display screen 31 of the terminal device 3, and meanwhile, the display screen 31 shows a timing indicator 32 controlled by a timing unit 232 and a plurality of voting indicators 33 corresponding to the digital contents 4 of the first group pairing, the voting indicators 33 being used to let the user select the digital contents 4 that they support; the competition review application receives the voting indicator 33 selected by the user and generates a voting behavior, the timing unit 232 checks a time limit corresponding to the timing indicator 32; if the user selects the voting indicator 33 within the time limit, the competition review application then transmits the voting behavior to the platform server 2, based on a competing team to which the digital contents 4 corresponding to the voting behavior belongs, a computing unit 233 of the platform server 2 increases a team popularity of the competing team and saves it to a team data in the integrated database 21; further, the computing unit 233 computes a popularity contribution by the user's selection at this time and/or the user's accumulated voting behaviors to help the competing team enhance the team popularity, and a plurality of popularity contributions made by a plurality of users, computes a contribution ranking, the platform server 2 transmits the team popularity, the popularity contribution, and the contribution ranking to the display screen 31 of the terminal device 3 to complete the first competition review cycle; then, the platform server 2 continues to transmit the digital contents 4 of a second group pairing to the display screen 31 of the terminal device 3, the competition review cycle is repeated till all of the group pairings complete their voting.

During the competition review cycle, the competing team can continuously upload new digital contents, the competition review application will update the digital contents in the media database, and the group pairing unit will conduct group pairings for the new digital contents.

The competition review application monitors the timing indicator, if a time limit is reached but no voting behavior by the user is detected, then the competition review application will immediately execute a punishment model.

The punishment model includes postponing the display of the next group pairing on the PK page and hiding the score result page in a way that the score result page is blurred out on the display screen.

Figure 4:
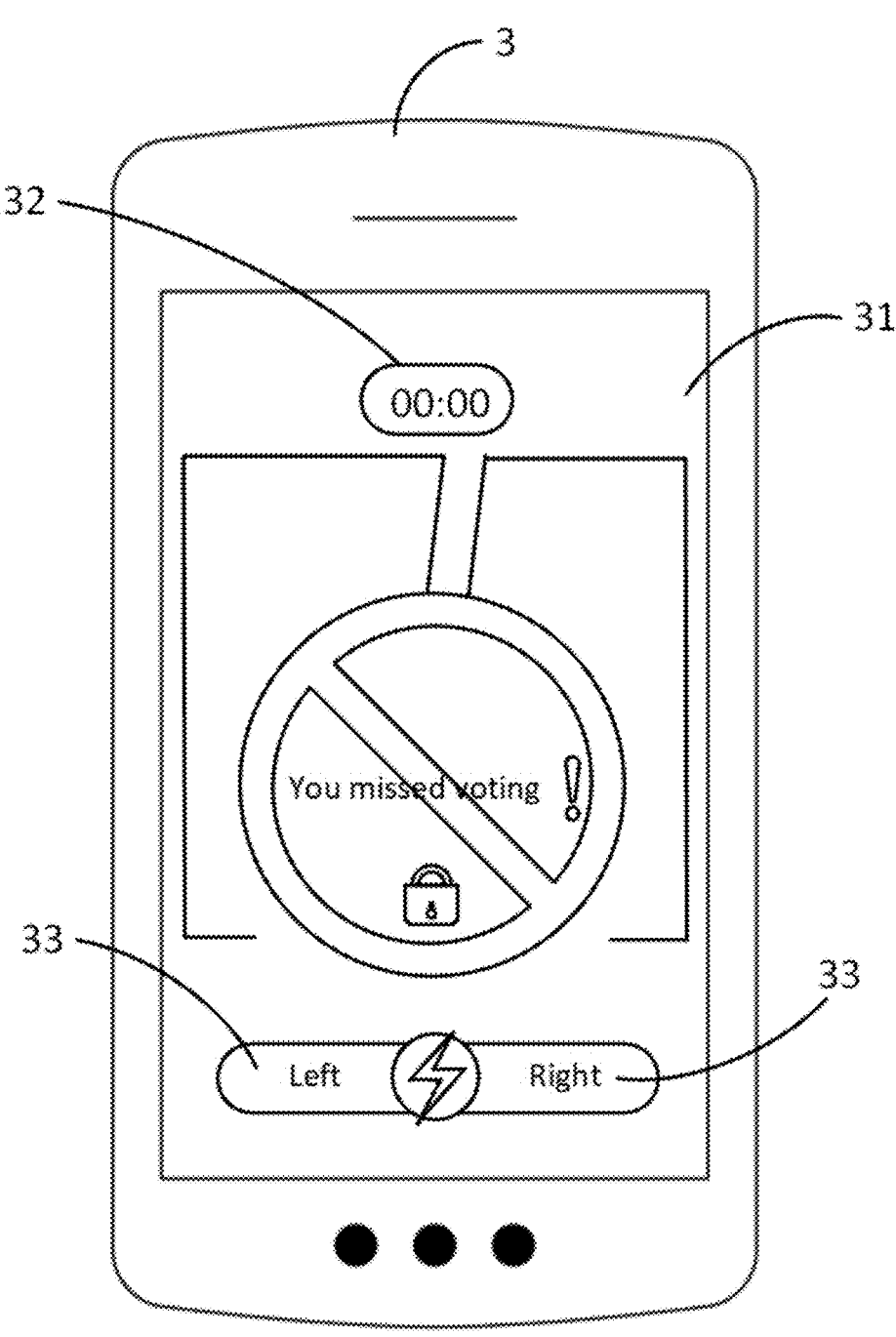
FIG. 4 The situation diagram of the punishment model.

The punishment model further includes a lock screen, as shown in FIG. 4.

In one embodiment, every time the competition review application completes a competition review cycle, it will display an inquiry screen to ask if the user wants to continue; if yes, then the next competition review cycle is started; if not, then the competition review application is terminated.

The platform server 2 saves the voting results of each competition review cycle of the user to a history record, based on the history record, the computing unit 233 statistically analyzes the user behavior tag of the user.

The pairing method conducts pairing after excluding the digital contents 4 uploaded by the same user and/or user members belonging to the competing team.

the pairing method also includes pairing between digital contents 4 of high similarity, for example, pairing those with category tags of similar meaning or those with similar digital content types.

The pairing method conducts pairing according to the first-layer category, i.e., according to same or similar natures of the images, photos, videos, texts, audios, and contents imported from external platforms, with no limitation.

The pairing method conducts pairing according the second-layer category, i.e., according to same or similar natures of the NFTs, games, songs, illustrations, maps, drawings, sports, matches, astronomy, and nature with no limitation.

In one embodiment, the pairing method firstly conducts pairing between the digital contents 4 of the same category tag according to the second-layer category, if the number of paired groups is insufficient, then conducts pairing between the digital contents 4 of the same category tag according to the first-layer category.

The category tags of the user behavior tags and the digital contents 4 have correlations in category within the same layer.

The pairing method computes the similarity between two digital contents 4 based a specific algorithm, and conducts pairing between two digital contents 4 with highest similarity, for example, using cosine similarity extension, with cosine score range from −1 to 1, wherein 1 is most similar, −1 is most dissimilar, to determine a pair of objects.

The pairing method selects digital contents 4 of similar length, similar file size, or similar popularity.

The voting indicator 33 further includes credits, tokens, and gifts, which can be selected by the user after completing the voting to support the creators of the digital contents 4 that the user likes, or to increase the popularity score of the team.

When an object that the user has already voted or repeated voting appears, the computing unit 233 will reduce the team popularity based on the proportion or time of repetition.

Embodiment 2

A digital content competition review method is depicted in FIG. 6, wherein the method for users to upload digital contents includes:

A1. A platform server 2 receives a user account, a user password and/or an added note entered and sent by a user on a login page of a competition review application via a terminal device 3;

A2. The platform server 2 extracts a member list of a member data from an integrated database 21, and checks the user account and the user password to see if the user is in the member list;

A3. If not, then the platform server 2 notifies the competition review application to open a member registration procedure for the user to register;

A4. If yes, then the platform server 2 notifies the competition review application to allow the user to open a digital content competition participation page. The digital content competition participation page includes a competing team field. The user enters or selects a competing team in the competing team field. The competition review application transmits the competing team entered or selected by the user to the platform server 2;

A5. The platform server 2 receives the competing team, extracts a team member list from a team data of the integrated database 21 according to the competing team, and checks if the user account is in the team member list;

A6. If not, then the platform server 2 notifies the competition review application to open an application procedure to join the team;

A7. If yes, then the platform server 2 notifies the competition review application to allow the user to upload a digital content 4 and add a digital content information via an uploading interface of the digital content competition participation page;

A8. The platform server 2 receives the digital contents 4 and the digital content information, and checks if there exists a repeated digital contents in a media database 22;

A9. If yes, then the uploaded digital contents 4 is not saved and a failure message is sent to the competition review application;

A10. If not, the platform server 2 will then associate the digital contents 4 to a category tag based on a labeling and classifying method, and save it together with the digital content information corresponding to the competing team to the media database 22.

Embodiment 3

Figure 3:
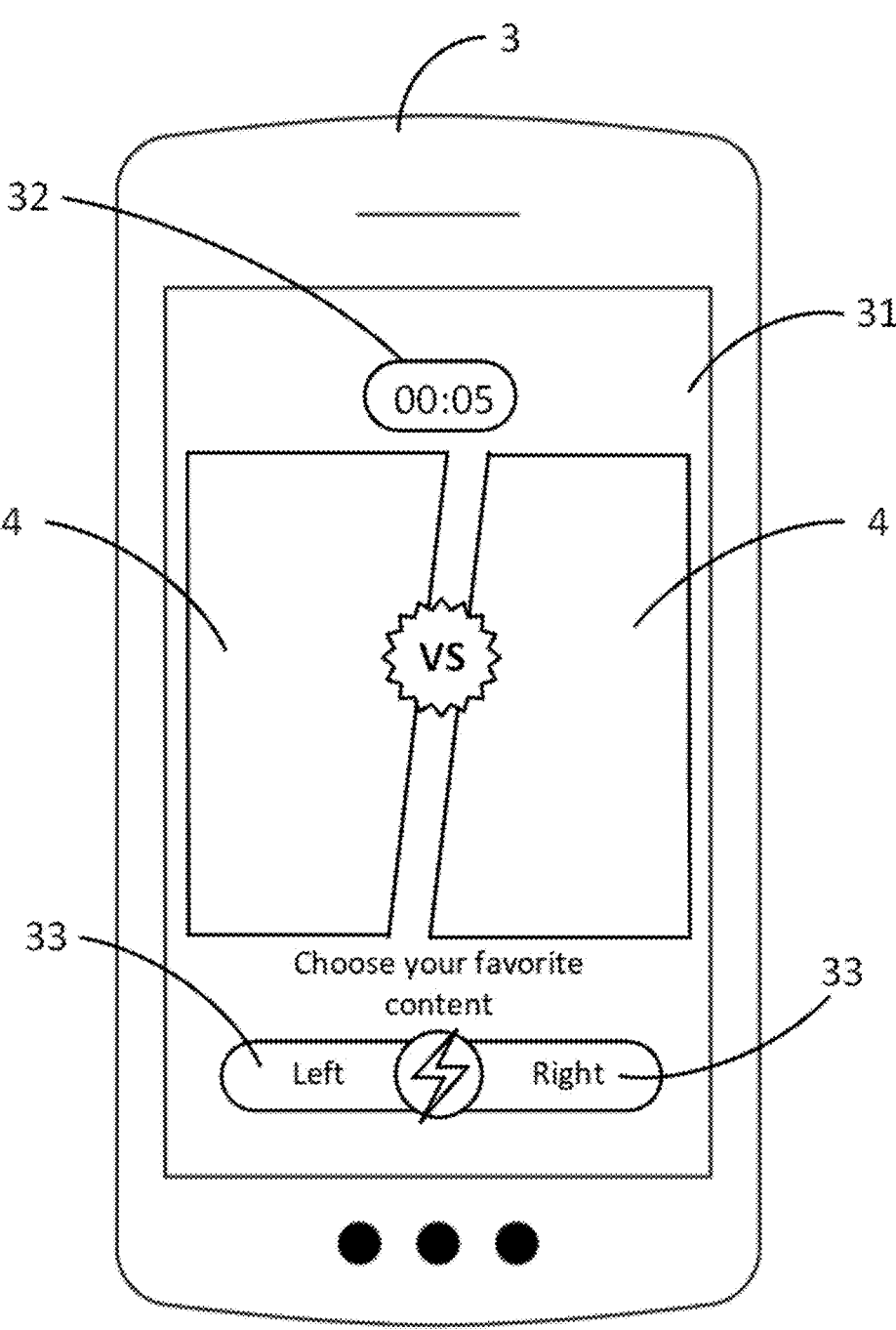
FIG. 3 The situation diagram of the PK page.
Figure 5:
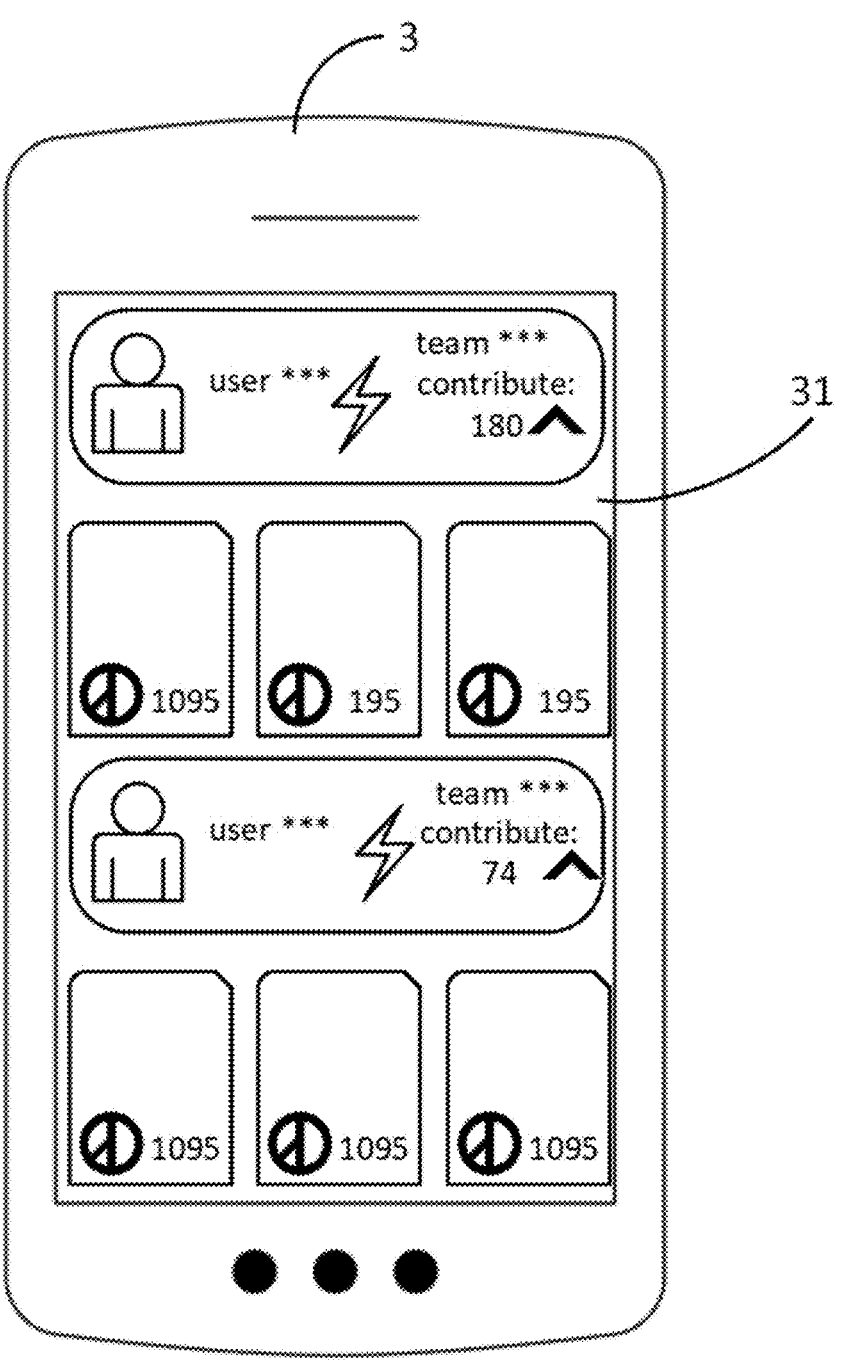
FIG. 5 The situation diagram of the score result page.

A digital content competition review method is depicted in FIG. 7, wherein the method for the user to participate in the digital content competition review includes:

A21. The platform server receives the user account and the user password sent by the user through the login page of the competition review application on the terminal device or\and the added note;

A22. The platform server 2 extracts the member list of the member data from the integrated database 21 and checks the user account and the user password to see if the user is in the member list;

A23. If not, then the platform server 2 notifies the competition review application to open the member registration procedure for the user to register;

A24. If yes, then the platform server 2 notifies the competition review application to allow the user to open a competition review page;

A25. based on the user account, the platform server extracts a user behavior tag saved in the member data, and by using the category tag of the digital content 4 corresponding to the user behavior tag as a screening condition, screens out a plurality of digital contents 4 from the media database sends it to a group pairing unit 231;

A26. based on the pairing method, the group pairing unit conducts a plurality of group pairings for those digital contents 4, and transmits the group pairings to the competition review application according to different groups;

A27. a competition review cycle is started, in which the competition review application receives a first group pairing transmitted by the group pairing unit 231, and displays the first group pairing through a PK (battle) page on a display screen 31 of the terminal device 3, and meanwhile displays a timing indicator 32 of a timing unit 232 and a plurality of voting indicators 33 of those digital contents 4 corresponding to the first group pairing is depicted in FIG. 3, the voting indicators 33 are for the user to execute a voting behavior;

A28. The competition review application detects the voting behavior and checks if the timing indicator 32 has reached a time limit;

A29. If the competition review application has not detected the voting behavior of the user or the timing indicator 32 has reached the time limit, then the competition review application will immediately executes a punishment model and transmits a timeout notification to the platform server 2, as shown in FIG. 4;

A30. If the voting behavior of the user is detected, then the competition review application transmits the voting behavior together with a voting reaction time corresponding to the timing indicator 32 when the user executes the voting behavior to the platform server 2. After they are saved to a history record in the integrated database 21, the competition review cycle is completed;

A31. Go back to A27 and repeat the competition review cycle till all of the group pairings are completed and shown in the PK page;

A32. based on the voting behavior in the competition review cycle, a computing unit 233 computes a team popularity of the competing team to which the digital content 4 that received votes belong, and further computes a popularity contribution of the user to the team popularity of the competing team as well as a contribution ranking, and store them in a team data of the integrated database 21;

A33. The platform server 2 returns the team popularity, the popularity contribution, and the contribution ranking to a score result page of the competition review application, as shown in FIG. 5.

The computing unit 233 further conducts a user behavior statistics based on the user's the voting behavior, the voting reaction time, the user's the history record and the categories in which the user has more interactions, and updates the user behavior tag of the user and saves it to the member data.

The computing unit 233 computes the team popularity, the popularity contribution, and the contribution ranking within each competition review cycle, and displays the score result page.

In one embodiment, the punishment model includes postponing the display of the next group pairing on the PK page.

In one embodiment, the punishment model includes hiding the score result page in a way that the score result page is blurred out on the display screen.

The digital content competition review method defined in Claim 1, the competition review cycle, the user accumulates the competition review cycles, once a specific number of cycles is reached, special functions of the competition review application can be unlocked, for example: watching competitions of special themes, gaining tokens, providing preferential prices to buy paid functions of the platform, and added personal ranking scores.

The platform server 2 further includes a mechanism to block fake accounts and robot accounts to prevent users from laundering the team popularity.

The invention claimed is:

1. A digital content competition review method, the method includes:

a platform server receives a user account sent by a user through a login page of a competition review application on a terminal device;

based on the user account, the platform server extracts a user behavior tag saved in a database, and by using a category tag of a plurality of digital contents corresponding to the user behavior tag as a screening condition, selects those digital contents matching the category tag from the database, and sends those selected digital contents to a group pairing unit;

based on a pairing method, the group pairing unit conducts a plurality of group pairings for those digital contents, and transmits those group pairings to the competition review application according to different groups;

a competition review cycle is started, in which the competition review application receives a first group pairing transmitted by the group pairing unit, and displays the first group pairing through a competition review page on a display screen of the terminal device, and meanwhile displays a timing indicator and a plurality of voting indicators of those digital contents corresponding to the first group pairing, those voting indicators are for the user to execute a voting behavior;

if the competition review application detects the voting behavior of the user, it will transmit the voting behavior to a computing unit;

based on the voting behavior in the competition review cycle, the computing unit computes a team popularity of a competing team that a voted digital content belongs to, and further computes a popularity contribution of the user to the team popularity of the competing team, and sends them back to a score result page of the competition review application to complete the competition review cycle;

the competition review cycle is repeated till all of those group pairings are displayed on the competition review page.

2. The digital content competition review method defined in claim 1, wherein, the competition review application monitors the timing indicator, if a time limit is reached but no the voting behavior of the user is not detected, then the competition review application will immediately execute a punishment model, the punishment model includes postponing the display of the next group pairing on the competition review page and hiding the score result page in a way that the score result page is blurred out on the display screen.

3. The digital content competition review method defined in claim 1, wherein, during the competition review cycle, the competing team can continuously upload new those digital contents, the competition review application will update those digital contents in the database, and the group pairing unit will conduct group pairings for the new those digital contents.

4. The digital content competition review method defined in claim 1, wherein, the voting behavior further includes a voting reaction time, and the computing unit will further conduct a user behavior statistical analysis based on the voting behavior of the user and the history record and update the user behavior tag of the user.

5. The digital content competition review method defined in claim 1, wherein, those voting indicators further includes credits, tokens, and gifts, which can be selected by the user after completing the voting to support the creators of the digital contents that the user likes, or to increase the popularity score of the team.

6. The digital content competition review method defined in claim 1, wherein, the category tags and the user behavior tags have correlations, a first-layer category tag includes images, photos, videos, texts, audios, and contents imported from external platforms, a second-layer category tag includes NFT, games, songs, illustrations, maps, drawings, sports, matches, astronomy and nature.

7. The digital content competition review method defined in claim 6, wherein, the pairing method firstly conducts pairing between those digital contents of the same category tag according to the second-layer category tag, if those group pairings is insufficient, then conducts pairing between those digital contents of the same category tag according to the first-layer category tag.

8. The digital content competition review method defined in claim 1, wherein, those digital contents are uploaded to the platform server by the users who are designated by the competition review application to a competing team, the platform server will categorize those digital contents based on a labeling and classifying method, and associate those digital contents with the category tag and save them to the database according to the corresponding competing team.

9. The digital content competition review method defined in claim 1, wherein, the pairing method conducts pairing after excluding those digital contents uploaded by the same user and/or user members belonging to the competing team.

10. The digital content competition review method defined in claim 1, wherein, the user accumulates the competition review cycle, once a specific number of cycles is reached, special functions of the competition review application can be unlocked, including watching competitions of special themes, gaining tokens, providing preferential prices to buy paid functions of the platform, and added personal ranking scores.

\* \* \* \* \*